United States Patent
Chidubem et al.

(10) Patent No.: US 10,823,024 B2
(45) Date of Patent: Nov. 3, 2020

(54) EXHAUST TAIL PIPE/EMISSIONS FILTER

(71) Applicants: Raphael Koroma Chidubem, Richmond, VA (US); Aaron Darnell Chidubem, Richmond, VA (US)

(72) Inventors: Raphael Koroma Chidubem, Richmond, VA (US); Aaron Darnell Chidubem, Richmond, VA (US)

(*) Notice: Subject to any disclaimer, the term of this patent is extended or adjusted under 35 U.S.C. 154(b) by 104 days.

(21) Appl. No.: 15/769,583

(22) PCT Filed: Oct. 20, 2015

(86) PCT No.: PCT/US2015/000124
§ 371 (c)(1),
(2) Date: Apr. 19, 2018

(87) PCT Pub. No.: WO2017/069722
PCT Pub. Date: Apr. 27, 2017

(65) Prior Publication Data
US 2018/0313242 A1 Nov. 1, 2018
US 2020/0248600 A2 Aug. 6, 2020

(51) Int. Cl.
| | | |
|---|---|---|
| *F01N 3/023* | (2006.01) | |
| *F01N 3/022* | (2006.01) | |
| *F01N 3/021* | (2006.01) | |
| *F01N 3/031* | (2006.01) | |
| *F01N 3/08* | (2006.01) | |
| *F01N 3/24* | (2006.01) | |
| *F01N 13/08* | (2010.01) | |

(52) U.S. Cl.
CPC ............ *F01N 3/023* (2013.01); *F01N 3/021* (2013.01); *F01N 3/022* (2013.01); *F01N 3/0211* (2013.01); *F01N 3/0215* (2013.01); *F01N 3/031* (2013.01); *F01N 3/0892* (2013.01); *F01N 3/24* (2013.01); *F01N 13/082* (2013.01); *F01N 2240/05* (2013.01); *F01N 2410/08* (2013.01); *F01N 2450/18* (2013.01); *F01N 2450/30* (2013.01); *Y02A 50/2322* (2018.01); *Y02T 10/20* (2013.01)

(58) Field of Classification Search
CPC ........ F01N 3/023; F01N 3/0211; F01N 3/022; F01N 3/031; F01N 3/0892; F01N 2410/08
See application file for complete search history.

(56) References Cited

U.S. PATENT DOCUMENTS

| | | | |
|---|---|---|---|
| 3,224,171 A | | 12/1965 | Bowman |
| 3,406,501 A | * | 10/1968 | Watkins .................. F01N 3/033 96/135 |
| 3,548,591 A | * | 12/1970 | McKay .................... F01N 3/021 60/311 |
| 3,675,398 A | | 7/1972 | Giarrizzo |
| 4,578,091 A | * | 3/1986 | Borja ...................... B01D 47/14 95/214 |
| 4,738,958 A | | 4/1988 | Franco et al. |
| 4,783,958 A | * | 11/1988 | Borja ...................... F01N 3/021 55/DIG. 30 |

(Continued)

OTHER PUBLICATIONS

"Bead-Shaped Activated Carbon (BAC)," archived as early as Nov. 4, 2014, Kureha. (Year: 2014).*

*Primary Examiner* — Audrey K Bradley
(74) *Attorney, Agent, or Firm* — Blank Rome LLP

(57) ABSTRACT

An exhaust tailpipe/emissions filter employs a reusable/replaceable insert and is configured to slide into and/or onto the exhaust tailpipe of an automobile to reduce air pollution.

11 Claims, 2 Drawing Sheets

(56) References Cited

U.S. PATENT DOCUMENTS

| | | | | |
|---|---|---|---|---|
| 5,053,062 | A * | 10/1991 | Barris | F01N 3/0211 |
| | | | | 392/485 |
| 5,089,129 | A * | 2/1992 | Brigman | B01D 35/06 |
| | | | | 210/223 |
| 5,162,287 | A * | 11/1992 | Yoshimoto | B01D 53/944 |
| | | | | 423/215.5 |
| 5,912,370 | A * | 6/1999 | McConkey | F01N 3/021 |
| | | | | 55/385.3 |
| 6,056,796 | A * | 5/2000 | Chiang | B01D 46/0021 |
| | | | | 55/302 |
| 7,329,298 | B1 * | 2/2008 | Hasinski | B01D 39/12 |
| | | | | 123/198 E |
| 2002/0046555 | A1 * | 4/2002 | Sherwood, Jr. | B01D 46/0063 |
| | | | | 55/482 |
| 2002/0053283 | A1 | 5/2002 | Akyildiz | |
| 2005/0262817 | A1 * | 12/2005 | Hatanaka | F01N 3/0212 |
| | | | | 55/282.3 |
| 2007/0084199 | A1 | 4/2007 | Whitaker | |
| 2007/0104622 | A1 * | 5/2007 | Zuberi | B01D 46/0012 |
| | | | | 422/177 |
| 2008/0053068 | A1 | 3/2008 | Sangiovani | |
| 2012/0102902 | A1 * | 5/2012 | Gallagher | B01D 46/0021 |
| | | | | 55/484 |

\* cited by examiner

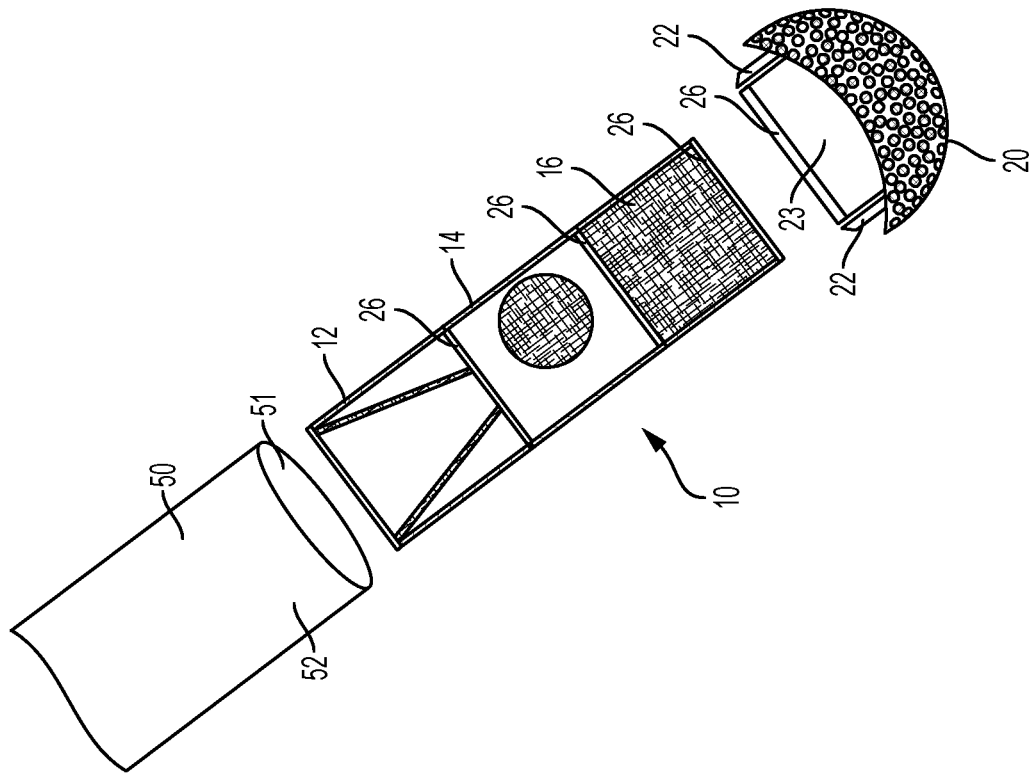
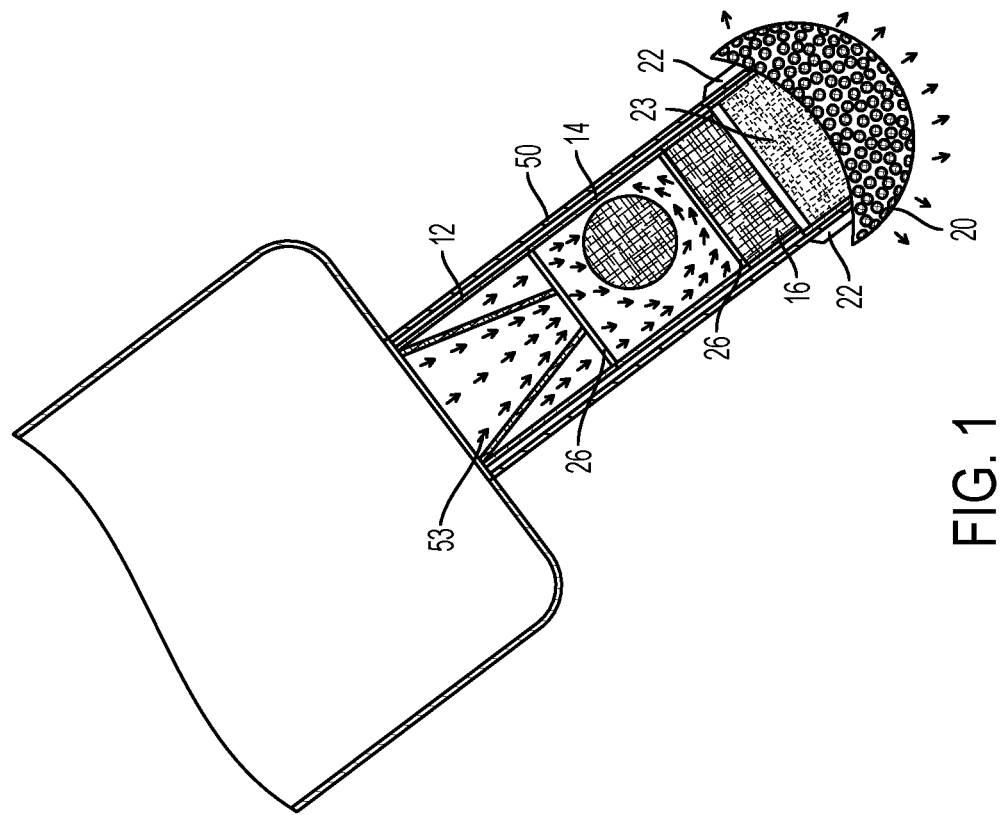

EXHAUST TAIL PIPE/EMISSIONS FILTER

The present disclosure relates to an emissions exhaust filtering system. The system is a reusable, recyclable, heat resistant, inter-exchangeable, interconnecting, emissions filtering system insert, designed primarily to fitter out the toxins of the exhaust emissions through the tail pipe of an automobile, but also available for industrial/commercial use, in the prevention of air pollution. The exhaust tailpipe/emissions filter employs a reusable/replaceable insert and is configured to slide into and/or onto the exhaust tailpipe of an automobile to reduce air pollution.

The unique filtering formula of the system includes components of reusable and/or disposable, interconnecting and exchangeable sections. Each connecting filter section contains its own specialized filtering design, creating different stages, resulting in an effective filtering process. The different stages of the filtering process (formula applied) is also designed to maximize the exhaust tail pipe air flow system, preventing blockage.

FIG. 1 is a suction view of an example emissions exhaust filtering system installed in an exhaust pipe in accordance with a first design.

FIG. 2 is an exploded view like FIG. 1.

Figure 4:
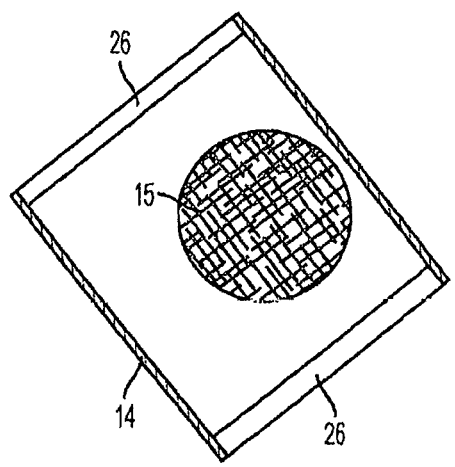
FIG. 4 is a section view of the sphere filter of the system of FIG. 1.

Refer now to FIGS. 1 and 2, there being shown an emissions exhaust filtering system, generally referred to by inference numeral 10, in accordance with a first design. The system 10 is a reusable, recyclable, heat resistant, inter-exchangeable, interconnecting, emissions filtering system insert, designed primarily to filter out the toxins of the exhaust emissions 53 through the tail pipe 50 of an automobile, also available for industrial/commercial use, in the prevention of air pollution. The exhaust tailpipe/emissions filter employs a reusable/replaceable insert and is configured to slide into and/or onto the exhaust tailpipe 50 of an automobile to reduce air pollution.

The unique filtering formula of system 10 includes components of reusable and/or disposable, interconnecting (at connection joints 26) and exchangeable sections. Each connecting filter 12, 14, 16, 20 contains its own specialized filtering design, creating different stages, resulting in an effective filtering process.

Figure 3:
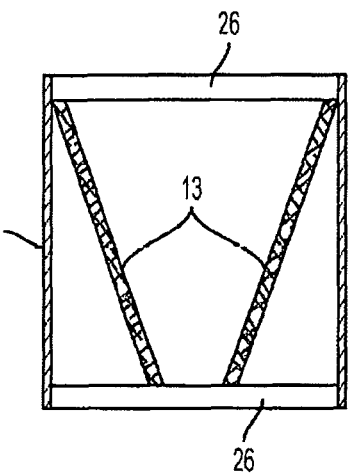
FIG. 3 is a section view of the cone filter of the system of FIG. 1.

The cone filter section 12, also shown in FIG. 3, is stage or step one, designed to increase pressure and maximize air flow. The cone filter 12 contains a cone shaped filter material 13. As shown by the exhaust emission flow arrows in FIG. 1, some of the exhaust flows through the cone material and some of the exhaust flows out the narrow end of the cone. The exhaust then flows from filter 12 past connection joints 26 into the sphere fitter section 14.

Figure 5:
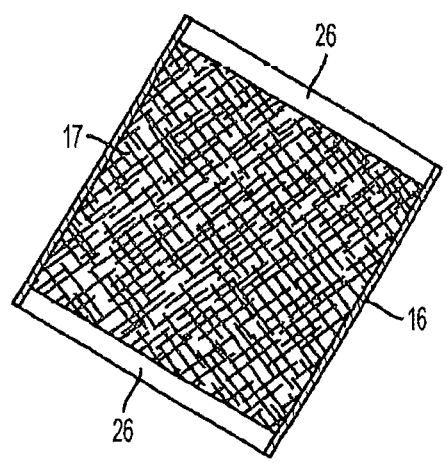
FIG. 5 is a section view of the grid filter of the system of FIG. 1.

The sphere filter section 14, also shown in FIG. 4, is stage or step two. The sphere filter 14 contains a sphere shaped filter material 15. As shown by the exhaust emission flow arrows in FIG. 1, some of the exhaust flows around the sphere material. The grid filter section 16, also shown in FIG. 5, is stage or step three. The grid filter 16 is contains grid shaped filter material extending through it.

Figure 6:
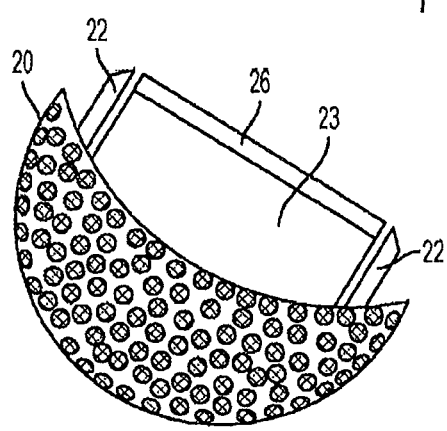
FIG. 6 is a view of is a view of the magnetic filter cap of the system of FIG. 1.

A magnetic filter bubble eye cap 20, also shown in FIG. 6, is the final filtering stage 4. The cap 20 is attached to the filtering inter-exchangeable sections (stages 1 through 3). As shown by the exhaust emission flow arrows in FIG. 1, the exhaust flows through the filter sections to exit from the filter cap 20. The filter cap 20 is designed with small magnetic clamps 23, 22 that attach onto the inside 51 and outside 52 of the exhaust tail pipe 50.

The system 10 is shown in FIG. 1 fully assembled and inserted inside of the exhaust tail pipe 50 in a full filtering formula. The heat resistant tail pipe filter 10 slides up into the exhaust tail pipe 50, excluding the sleeve 22. FIG. 2 is an exploded view showing the tail pipe 50, the filter stages one through three (sections 12, 14, 16) attached, and the stage four magnetic filter cap 20.

Figure 7:
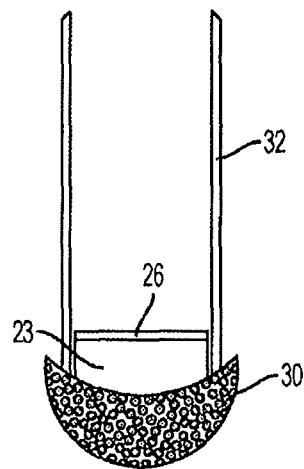
FIG. 7 is a view of a magnetic filter cap in accordance with a second design of an example emissions exhaust filtering system.

FIG. 7 is a view of an alternate stage four magnetic filter cap 30 that includes extended magnetic bars 32 forming tailpipe sleeve 32 for design two of the filter. The design two is a heat resistant tail pipe sleeve that slides onto and around the exhaust tail pipe, with a filter designed as a tail pipe insert. The filter is heat resistance is in compliance with federal regulations. The extended sleeve 32 for design two of the filter adds cosmetic value. Cosmetically, the exhaust tailpipe sleeve 32 and the vent caps 20 and 30 may colored, e.g., metallic blue, green, platinum, gold, bronze and red. In both designs one and two, the environmentally friendly tail pipe filter is heat resistant and contains a uniquely designed exhaust multi-stage filtering component configuration. The disposable filter sections are recyclable.

A routine maintenance interval for the filtering systems may be thirty, sixty, or ninety days, determined by the relevant automobile, mileage, oil consumption/maintenance, emissions levels and the filtering component selection. The component selection may be super duty formula (commercial/industrial use only), heavy duty formula, mild duty formula, or light duty formula.

The different stages of the filtering process (formula applied) is also designed to maximize the exhaust tail pipe air flow system, preventing blockage. In a worst case scenario, if the filter is over used and needs changing, this will block the air flow, preventing the vehicle from starting until changed/cleaned.

The filter may be made available in any shape and size and color, for all market applications with emission issues. All filter parts are heat resistant/inflammable, and designed to filter out the emission toxins while increasing the air flow, and maximizing air pressure.

The invention claimed is:

1. An emissions exhaust filtering system for an exhaust tail pipe, the emissions exhaust filtering system comprising:
a plurality of filter stages, the filter stages including a plurality of filter sections, wherein the plurality of filter stages are interconnected, and the plurality of filter sections are inter-exchangeable, and each connecting filter section having its own specialized filtering design, wherein the filter stages include a magnetic filter cap, wherein the magnetic filter cap includes a sleeve that slides onto and around the exhaust pipe, wherein the sleeve includes magnetic bars.

2. An emissions exhaust filtering system as in claim 1, wherein the filter stages include a cone filter section.

3. An emissions exhaust filtering system as in claim 1, wherein the filter stages include a sphere filter section.

4. An emissions exhaust filtering system as in claim 1, wherein the filter stages include a grid filter section.

5. An emissions exhaust filtering system as in claim 1, wherein the filter sections are adapted to slide up into the exhaust pipe, excluding the sleeve.

6. An emissions exhaust filtering system as in claim 1, wherein the filter stages are heat resistant.

7. An emissions exhaust filtering system as in claim 1, wherein the filter stages are reusable.

8. An emissions exhaust filtering system as in claim 1, wherein each of the plurality of filter stages further comprises a connection joint adapted to enable the inter-exchangeability of the plurality of filter stages.

9. An emissions exhaust filtering system for an exhaust tail pipe, the emissions exhaust filtering system comprising:
   a plurality of filter stages, the filter stages including a plurality of filter sections,
   the filter stages being interconnected and the filter sections being inter-exchangeable, and each connecting filter section having its own specialized filtering design, and
   wherein the filter stages include a magnetic filter cap and the magnetic filter cap includes magnetic clamps that attach onto an inside and an outside of the exhaust tail pipe.

10. An emissions exhaust filtering system as in claim 9, wherein the magnetic filter cap includes a sleeve that slides onto and around the exhaust pipe.

11. An emissions exhaust filtering system for an exhaust tail pipe comprising:
   a. a plurality of filter stages;
   b. the filter stages including a cone filter section;
   c. the filter stages including a sphere filter section;
   d. the filter stages including a grid filter section;
   e. the filter stages including a magnetic filter cap;
   f. the filter stages being interconnected;
   g. the filter sections being inter-exchangeable;
   h. each connecting filter section having its own specialized filtering design;
   i. the magnetic filter cap having a sleeve that slides onto and around the exhaust pipe, and having magnetic clamps that attach onto the inside and the outside of the exhaust pipe;
   j. the filter sections adapted to slide up into the exhaust pipe, excluding the sleeve;
   k. the sleeve including magnetic bars;
   l. the filter stages being heat resistant; and
   m. the filter sections being reusable or recyclable.

\* \* \* \* \*